US008165100B2

(12) United States Patent
Sabat et al.

(10) Patent No.: US 8,165,100 B2
(45) Date of Patent: Apr. 24, 2012

(54) TIME DIVISION DUPLEXED DIGITAL DISTRIBUTED ANTENNA SYSTEM

(75) Inventors: John Sabat, Merrimack, NJ (US); David Porte, Driftwood, TX (US)

(73) Assignee: Powerwave Technologies, Inc., Santa Ana, CA (US)

(*) Notice: Subject to any disclaimer, the term of this patent is extended or adjusted under 35 U.S.C. 154(b) by 33 days.

(21) Appl. No.: 12/340,401

(22) Filed: Dec. 19, 2008

(65) Prior Publication Data

US 2009/0180407 A1 Jul. 16, 2009

Related U.S. Application Data

(60) Provisional application No. 61/008,645, filed on Dec. 21, 2007.

(51) Int. Cl.
*H04B 7/212* (2006.01)

(52) U.S. Cl. .......................... 370/337; 370/280

(58) Field of Classification Search .................. 370/347, 370/95.3, 337, 350, 280; 455/562.1, 67.11; 398/115, 96; 375/219
See application file for complete search history.

(56) References Cited

U.S. PATENT DOCUMENTS

| | | | |
|---|---|---|---|
| 5,280,472 A | 1/1994 | Gilhousen et al. | |
| 5,479,409 A * | 12/1995 | Dupuy et al. | 370/337 |
| 5,513,176 A | 4/1996 | Dean et al. | |
| 5,533,011 A | 7/1996 | Dean et al. | |
| 5,627,879 A | 5/1997 | Russell et al. | |
| 5,644,622 A | 7/1997 | Russell et al. | |
| 5,657,374 A | 8/1997 | Russell et al. | |
| 6,560,441 B1 | 5/2003 | Sabat, Jr. et al. | |
| 6,665,289 B1 * | 12/2003 | Sebire et al. | 370/347 |
| 6,963,552 B2 | 11/2005 | Sabat, Jr. et al. | |
| 7,031,295 B2 * | 4/2006 | Schafer | 370/350 |
| 7,039,399 B2 | 5/2006 | Fischer | |
| 7,065,779 B1 | 6/2006 | Crocker et al. | |
| 2001/0037395 A1 | 11/2001 | Sabat, Jr. et al. | |
| 2002/0003645 A1 * | 1/2002 | Kim et al. | 359/145 |
| 2002/0136231 A1 | 9/2002 | Leatherbury et al. | |
| 2003/0014763 A1 | 1/2003 | Chappell et al. | |
| 2004/0096222 A1 * | 5/2004 | Cagenius | 398/115 |
| 2004/0106435 A1 * | 6/2004 | Bauman et al. | 455/562.1 |
| 2005/0114903 A1 | 5/2005 | Ahmed et al. | |
| 2006/0094470 A1 | 5/2006 | Wake et al. | |
| 2006/0153147 A1 * | 7/2006 | Chillariga et al. | 370/337 |
| 2007/0293157 A1 * | 12/2007 | Haartsen et al. | 455/67.11 |
| 2008/0145056 A1 * | 6/2008 | Boldi et al. | 398/96 |
| 2008/0259826 A1 * | 10/2008 | Struhsaker | 370/280 |
| 2009/0252206 A1 * | 10/2009 | Rheinfelder et al. | 375/219 |

OTHER PUBLICATIONS

Office Action dated Sep. 6, 2011 from U.S. Appl. No. 12/340,383.

\* cited by examiner

*Primary Examiner* — Kwang B Yao
*Assistant Examiner* — Syed M Bokhari
(74) *Attorney, Agent, or Firm* — OC Patent Law Group

(57) ABSTRACT

A Time Division Duplexed (TDD) digital distributed antenna system (DDAS) that performs simulcast distribution to multiple simulcast groups while using TDD time advanced burst to negate the data rate reducing effects of transport delays. The User Plane data is adapted for eliminating time delay ambiguities across multiple simulcast digital radios. In addition, the Control and Management Plane is aggregated across multiple remote units to allow a non-modified donor digital base station to control simulcast groups.

20 Claims, 8 Drawing Sheets

TIME DIVISION DUPLEXED DIGITAL DISTRIBUTED ANTENNA SYSTEM

RELATED APPLICATION INFORMATION

The present application claims the benefit under 35 USC 119(e) of U.S. provisional patent application Ser. No. 61/008,645 filed Dec. 21, 2007, the disclosure of which is incorporated herein by reference in its entirety.

FIELD OF THE INVENTION

The present invention relates to wireless communications systems and methods. More specifically, the present invention relates to digital distributed antenna systems (DDAS).

BACKGROUND OF THE INVENTION

Current wireless communications systems are directed to providing RF coverage and/or call capacity so that users may connect to the wireless infrastructure. All solutions rely on some means of distributing RF energy ranging from high power, large coverage area towers to low power in-building pico-cells.

There also exists a class of RF enhancement technologies known as RF repeaters. Some are bidirectional RF amplifiers that retransmit the signals received over the air from a host base station. Others are directly connected to a host base station and distribute the RF signals via either electrical, e.g., coaxial cable, or optical fiber distribution networks. In many cases the signals from a base station can be distributed to multiple antenna sites with a means called simulcast. Time Division Duplexed (TDD) systems represent a unique challenge due to DAS distribution delays and synchronization with the donor base station. More specifically, Distributed Antenna Systems are used to provide wireless communications coverage where it is impractical to install a conventional base station. An example is in-building coverage where low cost radiating antennas are desired and base stations represent either too large or too expensive a solution. Distributed Antenna Systems allow a donor base station to be located outside the desired coverage area and its RF signals are distributed to multiple antennas using either electrical or optical means. A means to distribute the base station's signals to more than one antenna is termed simulcast. In the direction toward the wireless user, i.e., downlink/forward path, the signal is replicated for each remote location. On the return direction, i.e., uplink/reverse path, the signals from multiple remote locations are summed to create a single composite signal for the base station. For both the base station and the user's device, the multiple copies of the RF signal appears as multipath reflections and is compensated for by the use of equalizers and rake receivers.

Simulcast is readily accomplished with a base station providing RF inputs and outputs. These techniques are well known to those skilled in the art. Also, for digital distribution, antenna remoting techniques are known to those skilled in the art.

TDD base stations provide an added layer of complexity for distributed antenna systems that use active electronics. Since a TDD system shares the same frequency for both downlink and uplink in a time shared fashion, the DAS must very precisely derive TDD timing information to prevent equipment damage to either itself or the host base station, and to prevent jamming of other base stations by the DAS remotes. An example of such a TDD airlink is WiMAX with details widely available in the public domain.

In FIG. 1 a block schematic drawing of a Distributed Antenna System (DAS) having direct RF connection to the donor TDD base station with analog optical distribution to the Remote RF Units is shown. Simulcast distribution may be performed either in the RF or optical domains.

In FIG. 2 a block schematic drawing of a DAS having direct RF connection to the donor TDD base station with digital optical distribution to the Remote RF Units is shown. Simulcast distribution may be performed either in the RF or digital electrical domains.

As shown in FIGS. 1 and 2, the current DAS solutions use either analog, i.e., 'RF over fiber'/'Analog DAS', links or sampled digital, i.e., 'digital DAS', links and are based on an analog RF connection to the base station. The DAS signals are fed to one or more RF modules, through a technique called simulcast.

Simulcast is readily accomplished with a base station providing RF inputs and outputs. These techniques are well known to those skilled in the art. Also, for digital distribution, antenna remoting techniques are known to those skilled in the art.

FIGS. 1 and 2 show a single base station sector 102, i.e. group of RF carriers, connected to multiple remote RF Units 110. This is not just a demultiplexing operation where multiple RF carriers from the host base station are separated for distribution to separate Remote RF Units. All Remote RF Units transmit and receive the same group of RF carriers as the host/donor base station to which they are connected.

The Remote RF Units are at a different geographical location and they provide either widely separated or partially overlapping coverage areas. For the latter a mobile user's radio may receive identical signals from multiple Remote Units and that composite signal will appear as multipath to that wireless device. For TDD systems, the transmit/receive timing from individual DAS remote units and surrounding non-DAS radiators must also be closely matched, to prevent the transmit cycle of one from jamming the receive cycle of another.

These same multipath and time delay considerations also apply in the reverse direction where a user's device signal is received by multiple remote units. The multiple received signals are summed within the simulcast hardware of the DAS system to provide a single composite signal to the host donor base station 102. Additionally, the TDD base station sets timing constraints on the amount of time delay differential that can be tolerated from the DAS.

For a purely analog distribution network, illustrated in FIG. 1, the simulcast can be accomplished through RF splitters on the downlink, and RF summers on the uplink. The same splitting and summing can be accomplished in the analog optical domain, with the requirement that different optical wavelengths be used on the uplink. A digital distribution network, illustrated in FIG. 2, adds the extra steps of Analog-to-Digital and Digital-to-Analog conversions at both ends of the DAS network. As with the analog DAS, a set of RF summers and splitters can perform simulcast prior to conversion to the digital domain. Simulcast can also be implemented in the digital domain prior to conversion to digitally modulated optical signals.

There is now a new class of base stations with digital input and outputs that are meant to be used in conjunction with remote radio equipment to provide installation flexibility. Although these base stations allow the radio equipment to be remotely located from the base station core electronics, they require a one to one correspondence between each digital airlink stream and a remote radio unit. Detailed specifications of two digital base station interfaces are the Common Public Radio Interface (CPRI) and the Open Base Station Architecture Initiative (OBSAI). With this, a wireless coverage system incorporating a large number of remote antennas will require a large number of base stations along with the attendant issues of frequency re-use and wireless handovers as a user's radio moves throughout a coverage area. These interface standards have also incorporated WIMAX (Worldwide Interoperability for Microwave Access), a TDD airlink, into their specifications.

SUMMARY OF THE INVENTION

In a first embodiment of the present invention, a digital distributed antenna system (DDAS) is provided. The DDAS includes a base station providing transmit and receive time division duplexed (TDD) digital communication signals, one or more remote radio units, and one or more TDD fiber optic interface links coupled between the base station and the one or more remote radio units, wherein the base station provides a time advanced burst for downlink TDD communications with the one or more remote radio units to compensate for fiber transport delay and propagation delay.

The time advanced burst provides a partial overlap of a base station downlink burst and the remote radio unit receipt of an uplink burst from a remote user. Also, the time advanced burst is transmitted by the remote radio after the remote radio has finished receiving the uplink burst of a previous burst from a remote user. The DDAS system further includes means for triggering the base station to provide said time advanced burst.

In another embodiment of the present invention, a digital distribution communication network is provided. The digital distribution communication network includes a base station providing transmit and receive time division duplexed (TDD) digital communication signal, a plurality of TDD digital distributed radio (DDR) remotes coupled to receive the TDD digital signal from the base station, and a TDD DDR hub configured to provide a 1:N simulcast of the TDD digital communication signal, the TDD DDR hub coupled to the base station and each of the plurality of TDD DDR remotes, wherein the base station provides a time advanced burst for downlink and uplink TDD communication with the plurality of DDR remotes to compensate for fiber transport delay and propagation delay of the longest delay of the N remotes.

The TDD hub includes a multiplexer coupled to the TDD base station, a plurality of fiber optic digital interface links coupled to a plurality of multiplexers and to each of the corresponding plurality of DDR remotes, and a user plane processor for implementing summation and splitting operations, and providing a programmable delay for providing a common delay value to the TDD communication signals to and from the plurality of TDD DDR remotes.

The digital distribution communication network further includes a Control and Management (C&M) processor for processing the C&M plane from both the base station and the plurality of TDD DDR remotes and managing the simulcast distribution of that plane to the plurality of DDR remotes. The TDD DDR hub manages a remote digital interface delay to align a plurality of remote digital multiplexed TDD communication signals from the plurality of TDD DDR remotes. Each of the plurality of TDD DDR remotes includes a programmable delay for equalizing all of the plurality of DDR propagation times to the TDD DDR Hub. The TDD communication signal is a Common Public Radio Interface (CPRI) signal.

The time advanced burst provides a partial overlap of a base station downlink burst at the TDD DDR remote unit and its receipt of an uplink burst from a remote user. Additionally, the time advanced burst is transmitted by the remote after the TDD DDR remote has finished receiving the uplink burst of a previous burst from a remote user.

In still another embodiment of the present invention, a method for providing a time division duplexed (TDD) digital communication signal between a digital base station and a plurality of remote digital distributed radios (DDRs) is provided. The method includes providing and receiving a multiplexed TDD communication signal at a digital base station via a digital distributed interface unit, processing the digital multiplexed TDD communication signal for controlled distribution of a 1:N simulcast distribution of the digital multiplexed TDD communication signal to and from a plurality of remote DDRs, and providing a time advanced burst for downlink TDD communications with the plurality of remote radio units to compensate for fiber transport delay and propagation delay, wherein the digital distributed interface unit manages a remote digital time delay to align a plurality of remote digital multiplexed TDD signals from the plurality of remote DDRs.

The method further includes triggering the base station to provide the time advanced burst, processing a C&M plane from both the digital base station and the plurality of remote DDRs, and managing the simulcast distribution of the data plane to the plurality of remote DDRs.

DETAILED DESCRIPTION OF THE INVENTION

The invention provides a distributed antenna system (DAS) system and method of providing simulcast techniques to digital distributed radio equipment that are supporting Time Division Duplexed (TDD) airlinks between the base station and the remote radio electronics.

TDD base stations provide an added layer of complexity for distributed antenna systems that use active electronics. Since a TDD system shares the same frequency for both downlink and uplink in a time shared fashion, the DAS must very precisely derive TDD timing information to prevent equipment damage to either itself or the host base station. Additionally, this timing information must be accurately provided to the DAS remote units to maintain their RF output in accurate time synchronization with non-DAS base stations in the area to prevent self jamming. The DAS remotes must also compensate for fiber transport during the process of maintaining the necessary time synchronization.

Figure 1:
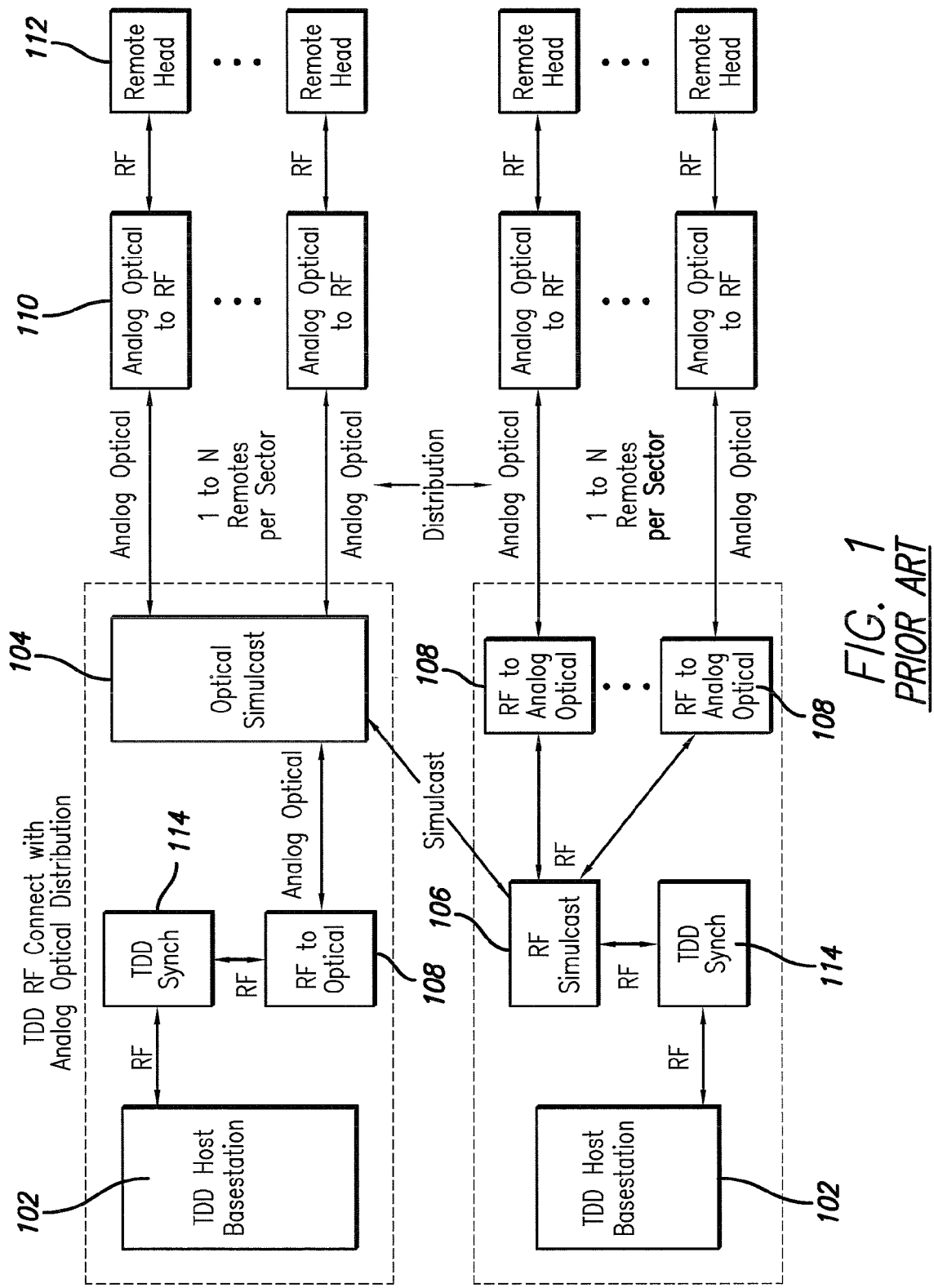
FIG. 1 is a block schematic drawing of a Distributed Antenna System (DAS) having direct RF connection to the Time Division Duplexed (TDD) donor base station with analog optical distribution to the Remote RF Units.
Figure 2:
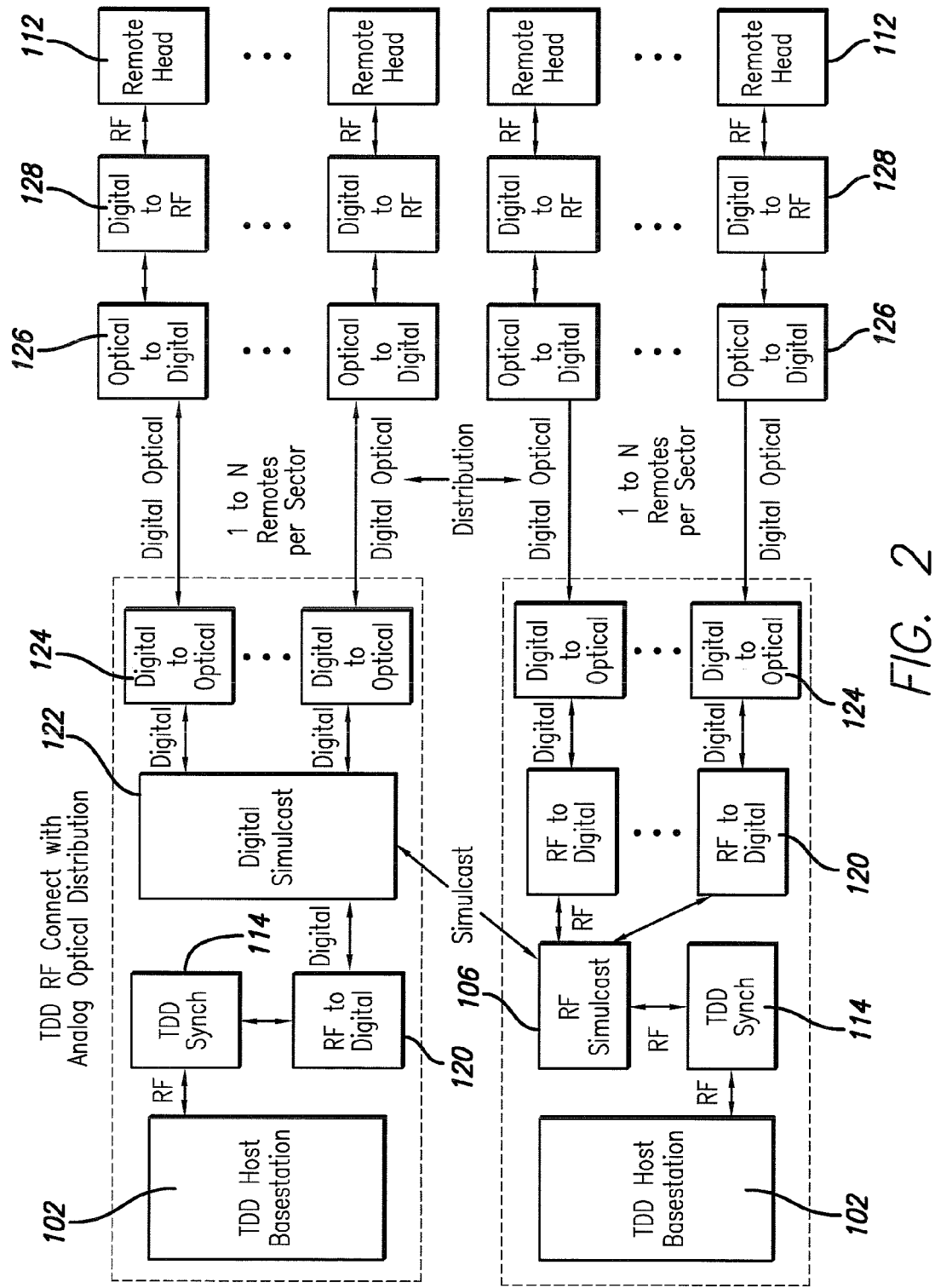
FIG. 2 is a block schematic drawing of a DAS having direct RF connection to the TDD donor base station with digital optical distribution to the Remote RF Units.
Figure 3:
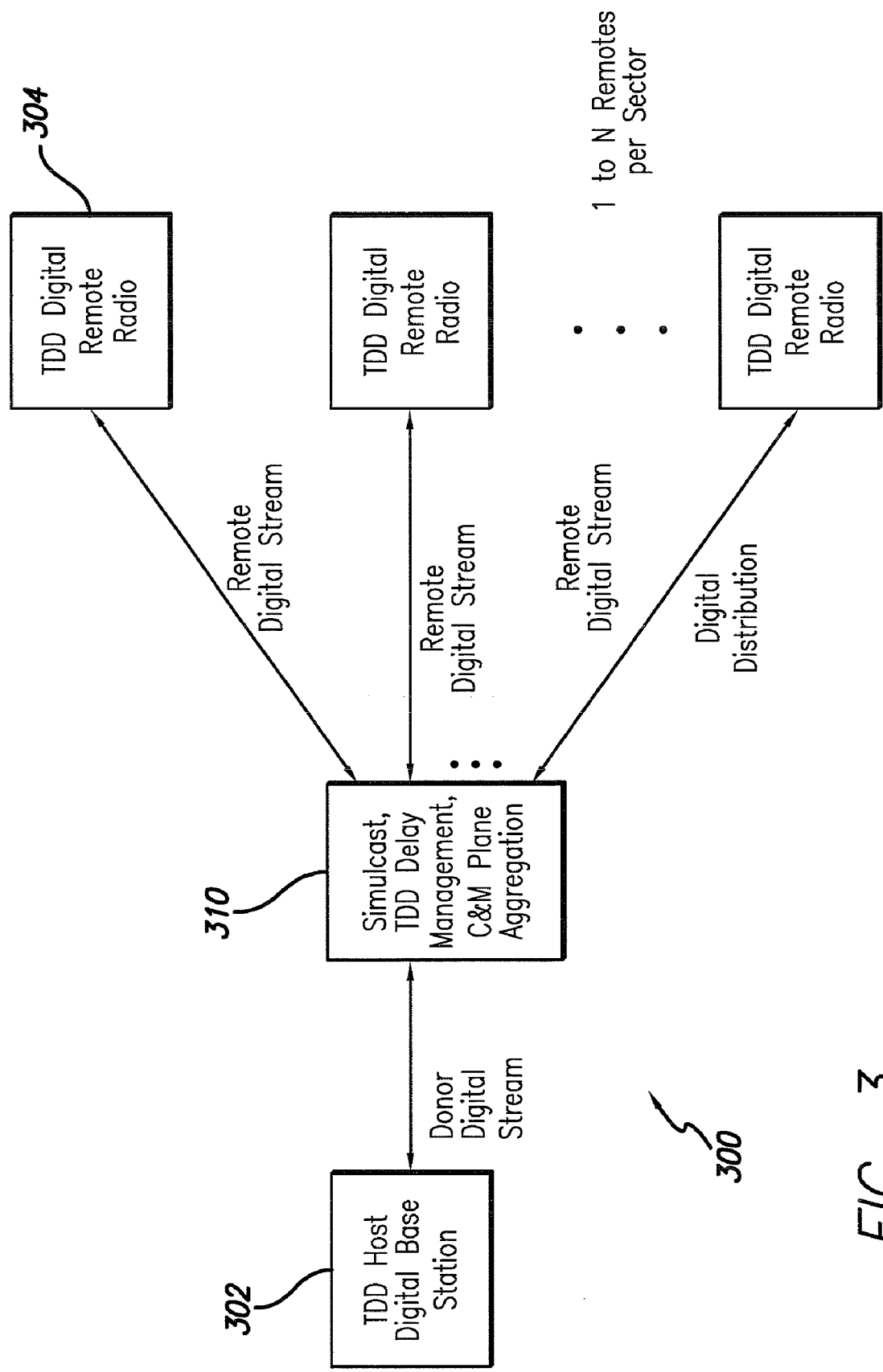
FIG. 3 is a block schematic drawing of a host TDD digital base station and Digital Distributed Radio with direct digital connection to the TDD donor base station with digital distribution to the Digital Remote Radios according to an embodiment of the present invention.

FIG. 3 is a preferred embodiment of the invention illustrating a simple top level diagram of a TDD digital host base station 102 in conjunction with a Distributed Antenna System (DAS) network 300 with simulcast capability.

As shown, FIG. 3 is a block schematic drawing of a host TDD digital base station and Digital Distributed Radio (DDR) with direct digital connection to and from the TDD donor base station with digital distribution to the Digital Remote Radios. This has a digital multiplexed communication signal with a timing requirement incompatible with conventional simulcast techniques, as discussed above. For this and subsequent diagrams, a specific digital base station interface (CPRI) and airlink (WiMax) will be used as an examples for labeling and description purposes. However, this could be an OBSAI base station interface.

Accordingly, the Common Public Radio Interface (CPRI) detailed specification Versions 1.4, 2.4, 3.0 and 4.0, hereby incorporated by reference, is directed to the digital base station interface between radio equipment control and radio equipment (www.cpri.info/spec.html). Additionally, the Worldwide Interoperability for Microwave Access (WiMAX) standard (www.wimaxforum.org) and the Open Base Station Architecture Initiative (OBSAI) standard for base station interface are hereby incorporated by reference (www.obsai.org).

The TDD base station 302 may be referred to as an REC (Radio Equipment Control). Remote TDD transceiver units 304 will be referred to as the TDD Digital Distributed Radio (DDR) units. The simulcast portion of the network in conjunction with the donor base station is referred to as the TDD DDR Hub 310. Simulcast distribution is performed digitally along with delay management, and control aggregation in the DDR Hub 310.

Again referring to FIG. 3, the DDR Hub 310 takes Donor CPRI signals from the REC 302 and performs the function of 1:N simulcast on the wireless airlink signal, i.e., the user plane data. The DDR Hub 310 is also responsible for managing the CPRI delay and C&M plane aggregation. Command of each individual DDR 304 is via a set of remote CPRI commands transmitted via a corresponding fiber-optic cable 320. Since the donor side digital interface is bidirectional, TDD timing concerns are not present on the base station side of the DDR Hub 310.

Figure 4:
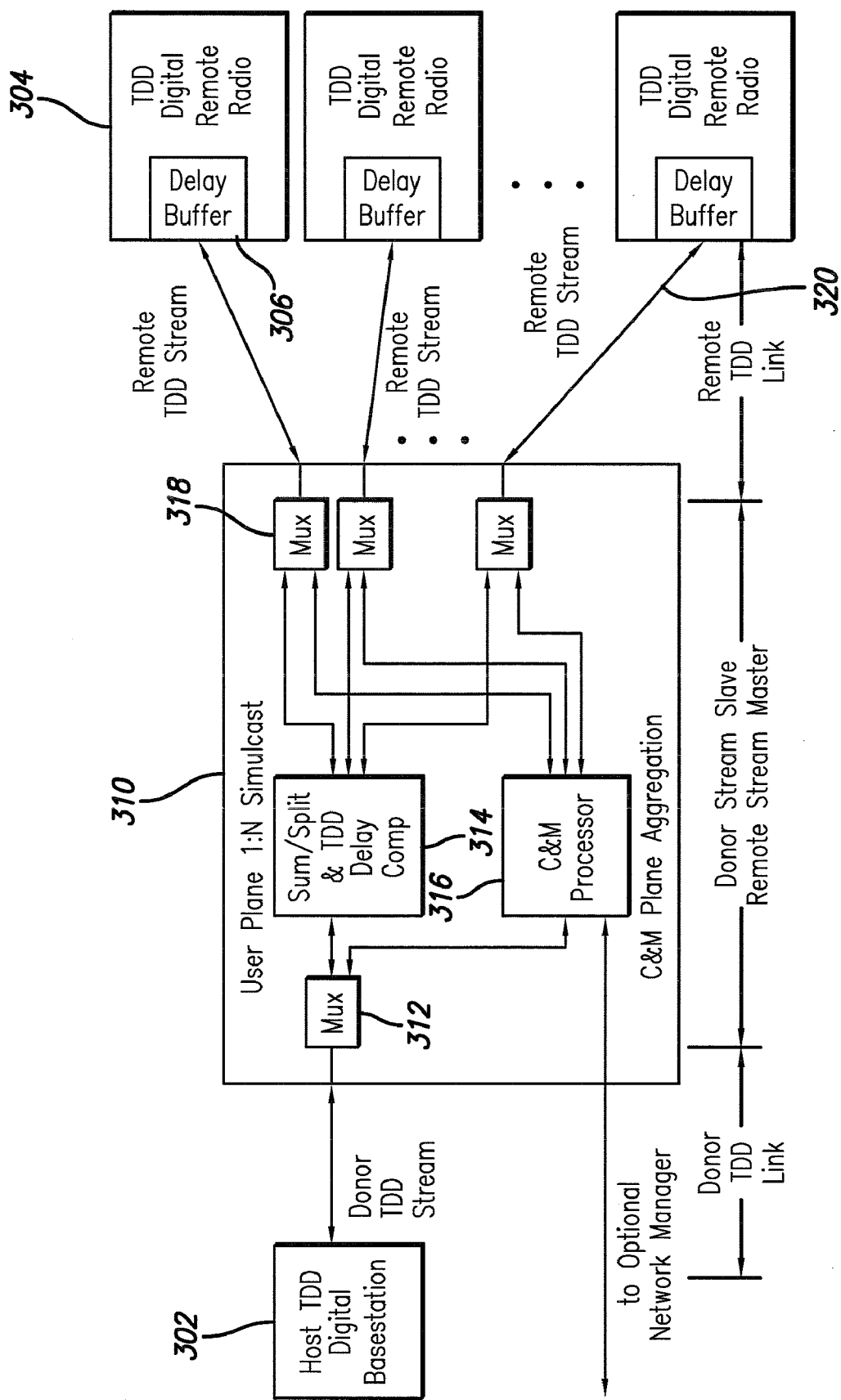
FIG. 4 is a block schematic drawing of a host TDD digital base station and Digital Distributed Radio with a detailed diagram of the Digital Distributed Radio Hub, for a single donor base station configuration.

In FIG. 4, a block schematic drawing of a TDD host digital base station and TDD DDR with a detailed diagram of the TDD DDR Hub is shown for a single donor TDD base station configuration of a preferred embodiment of the present invention.

FIG. 4 provides additional detail for the DDR Hub 310, showing the user plane and C&M plane processing relationships. The user plane is typically implemented in hardware, e.g., an FPGA (field programmable gate array), as a simple duplication and redistribution on the forward link. On the reverse link, an arithmetic summation is used to combine the signals from all simulcasted remote digital radios 304 to provide a single combined reverse-link signal to the REC 302. On both the donor CPRI links and remote side CPRI links 320, the Control and Management (C&M) plane is de-multiplexed/multiplexed for processing in the C&M element processor 316 via multiplexers 312 and 318. Since the host base station 302 and associated CPRI link have no means for control and maintenance for multiple remote digital radios 304 on the control plane, information from all simulcasted remotes 304 is aggregated into a single entity of the entire simulcast group for presentation to the REC 302.

The digital interfaces, i.e., remote side CPRI links 320, have precise accuracy requirements for the propagation delay to the associated TDD remote digital radio 304. A simulcast group, will have different propagation delays due to the differing fiber lengths to each of the DDRs 304. To manage unequal fiber path delays, each DDR 304 incorporates a programmable link delay buffer 306 to equalize propagation time to the DDR Hub 310. Alternatively, the delay buffers 306 may be located within the DDR Hub 310 instead of within each DDR 304. These delay buffers 306 are programmed to provide an equal time delay from all remote DDRs 304 to the central DDR Hub 310.

Figure 5:
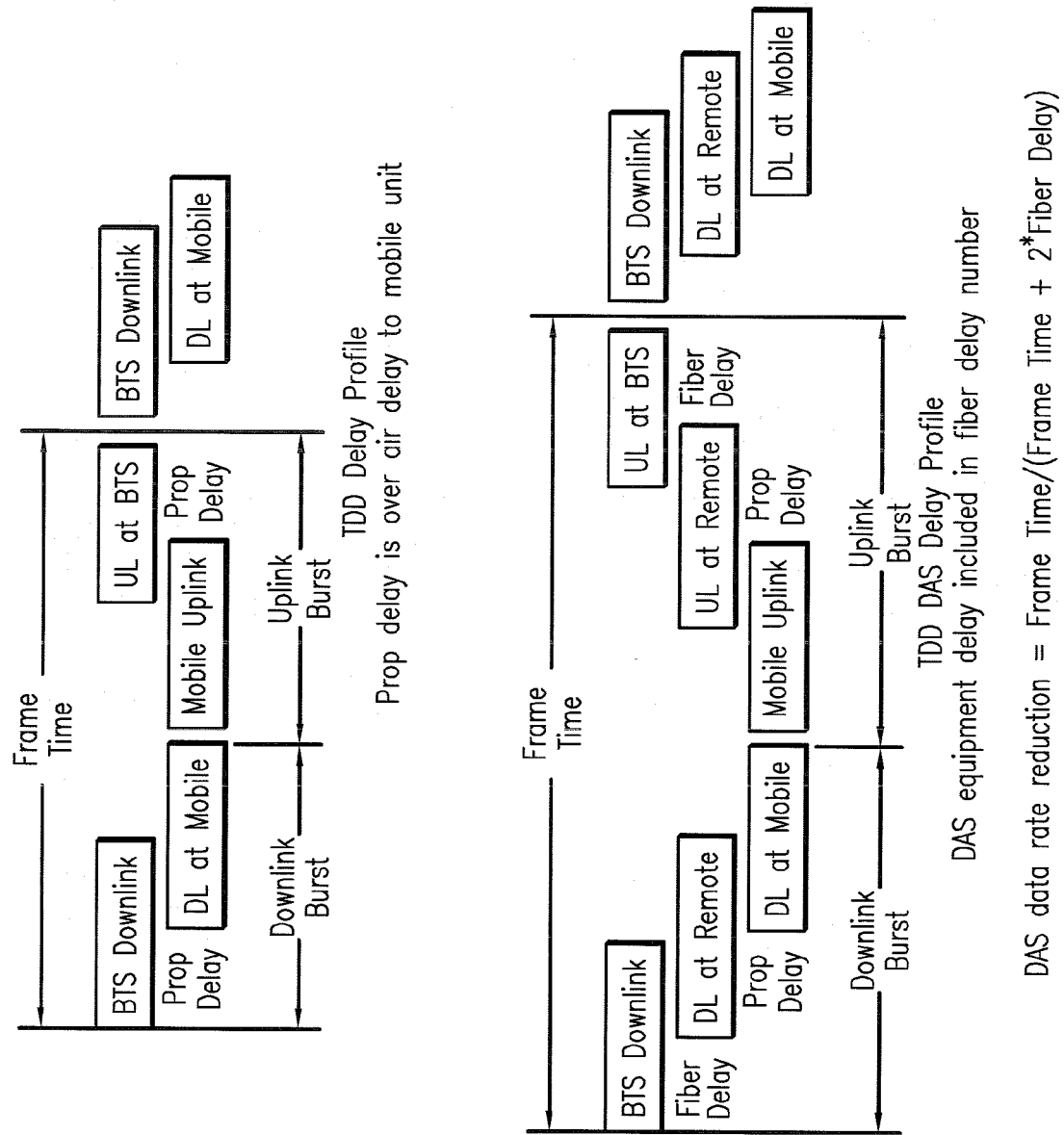
FIG. 5 is a TDD timing diagram showing the reduction in net data rate due to propagation delays across the DDAS transport network.

FIG. 5 illustrates TDD timing diagrams showing the reduction in net data rate due to propagation delays across the DDAS transport network (e.g. fiber network). Since there are no TDD concerns with the digital base station interface, the base station's timing may be altered to compensate for fiber transport delays.

As shown in FIG. 5, the TDD timing for a DAS network that uses a direct RF connection to the donor base station is provided. To prevent collisions at the TDD base station's antenna port, the frame time must be long enough to accommodate the downlink uplink data and over-the-air propagation to the user device, it must also absorb the fiber transport delay. This results in a net reduction in the served data rate in a ratio=frame_time/(frame_time+round_trip_fiber_delay).

Figure 6:
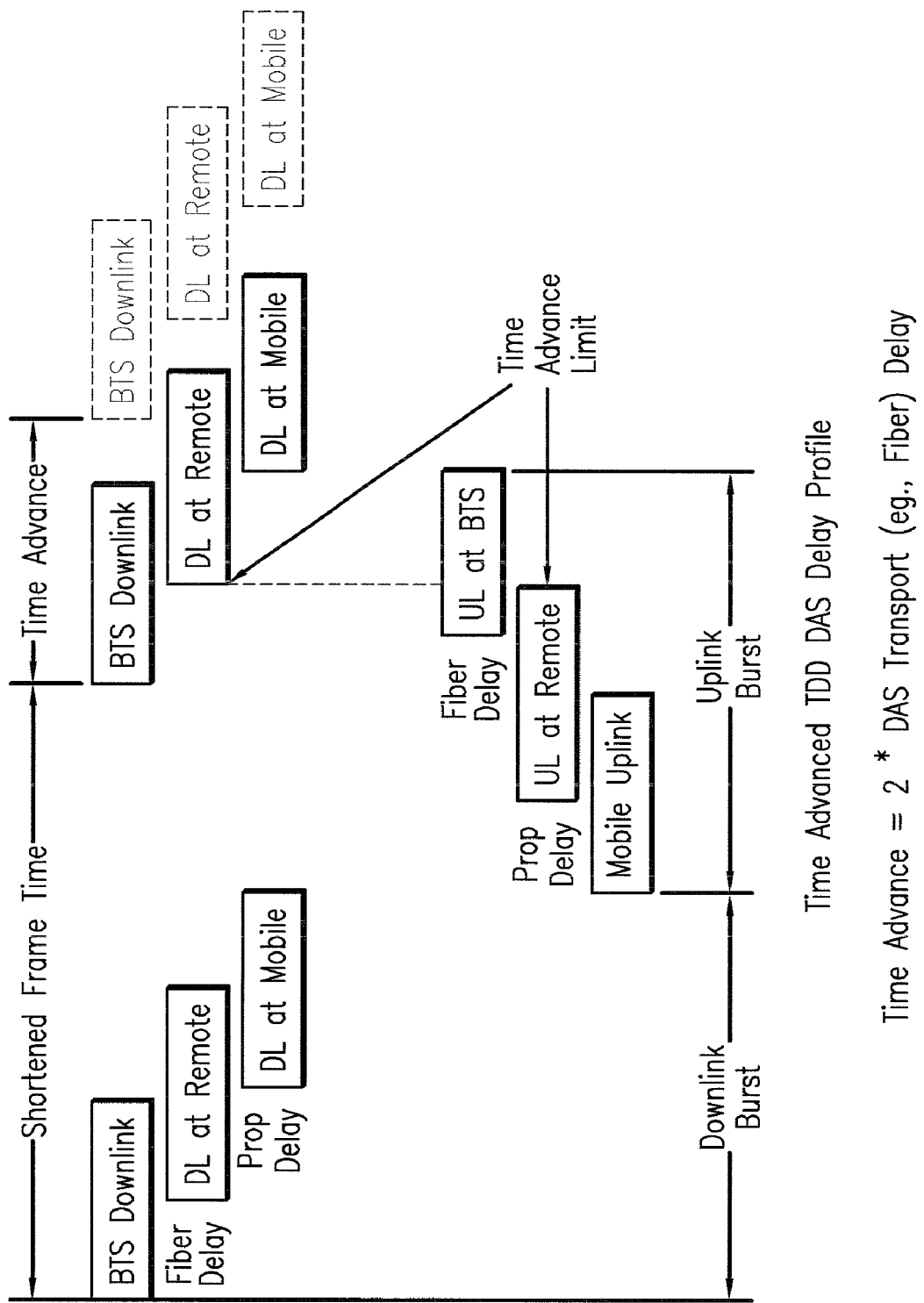
FIG. 6 is a TDD timing diagram with base station downlink timing advance to increase net data rate according to the present invention.

FIG. 6 is a TDD timing diagram with base station downlink timing advance to increase net data rate according to a preferred embodiment of the present invention.

As shown in FIG. 6, a DDAS network can be used with a suitably modified donor base station to negate the data rate reducing effects of long fiber transport delays. A multiple remote DDAS network or a single remote system may advantageously employ the timing advance to improve net data rate. The usual timing of the subsequent downlink burst, i.e., shaded blocks, are time advanced by the base station. The time advance burst is set so that the subsequent downlink burst will be transmitted just after the remote DDR has finished receiving the uplink burst of the previous frame. This results in a base station downlink timing advance=2* DAS transport (e.g., fiber) delay. The time advance burst advances the TDD timing of the output of the DAS and net data rate back to that of a conventional non-DAS REC transmission. The timing advance information will be provided by the DDAS as part of its timing and delay management process.

With reference to FIG. 4, the donor side digital interface, e.g., CPRI, cannot propagate from the base station to all simulcasted digital radios 304, since it's not designed for this purpose. Therefore, the donor side CPRI interface connection must be terminated at the TDD DDR Hub 310 and multiple remote side digital CPRI connections 320 must be originated for communication with the DDR remote Units 304. Since the base station 302 uses round trip delay to the remote digital radios 304 to compensate for end-to-end propagation delays, the donor side digital interface in the DDR Hub 310 incorporates a programmable delay buffer in the user plane processor 314 to reflect the common delay value for the digital multiplexed signals from all of the DDR remote units 304.

For the C&M plane, the C&M element processor 316 presents a combined view of the DDRs 304 to the REC 302. The C&M element processor 316 must intervene since the C&M plane from the donor base station 302 is unable to individually address, nor recognize the presence of multiple DDRs 304 in a common simulcast. The donor base station 302 operates in a manner consistent with communication and connection to a single remote radio while the C&M element processor 316 manages all aspects of fanning out the control plane to multiple DDRs 304.

Optionally, the C&M element processor 316 can provide a separate IP connection to a separate Network Management System, to provide individual C&M data on each DDR remote unit 304. This permits a connection, which is independent of the donor base station 302 to be provided to the operator of the installation.

In addition to the systems described above, more sophisticated embodiments based around multiple Hubs, or switches, allow expansion and reconfiguration of voice/data capacity, as well as, facilitate the addition of additional remote DDRs to the network.

Figure 7:
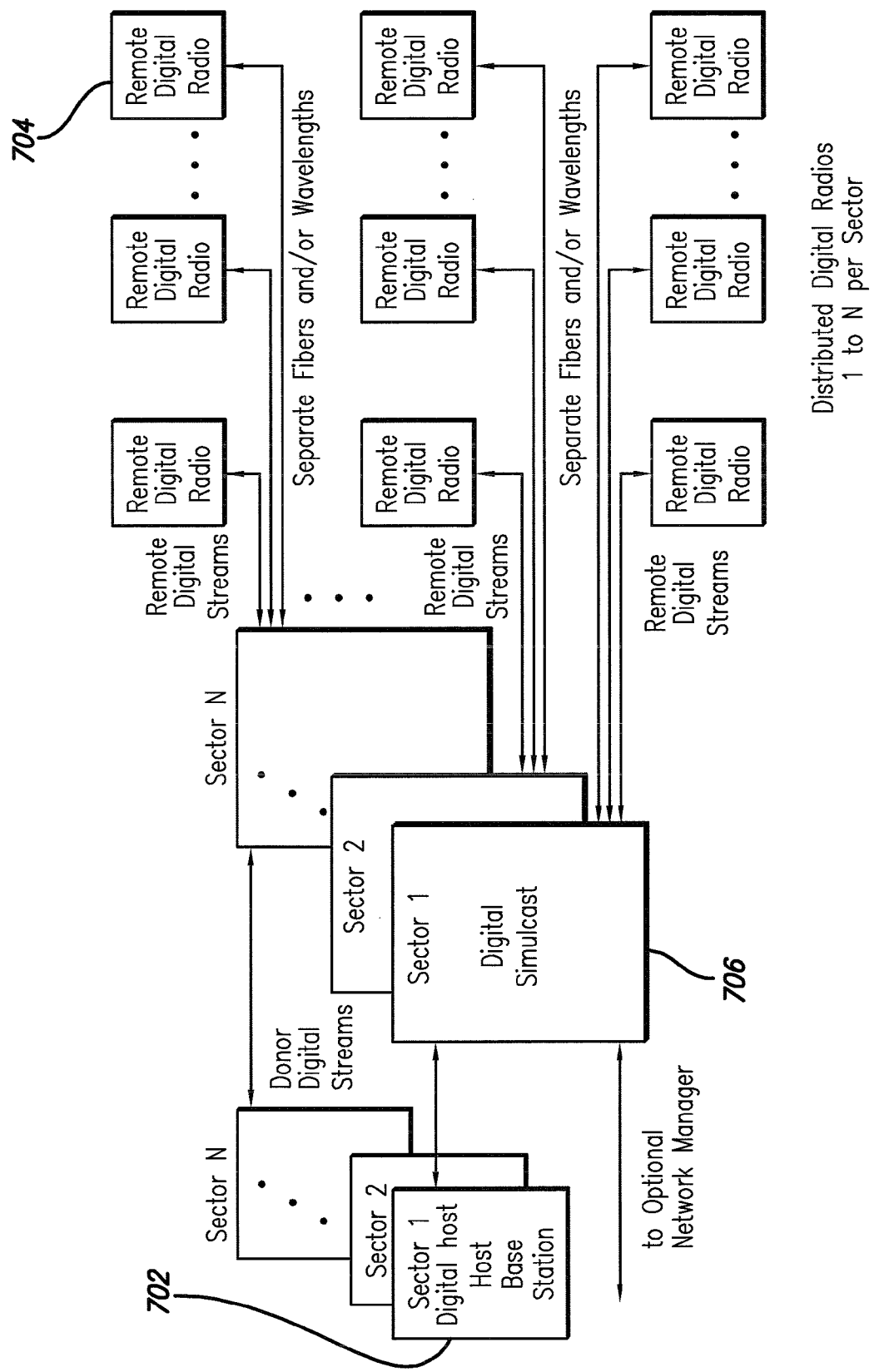
FIG. 7 is a block schematic drawing of a host TDD digital base station and Digital Distributed Radio with Digital Distributed Hub scaled up in size to support multiple base station sectors according to another embodiment of the present invention.

FIG. 7 is a block schematic drawing illustrating a host TDD digital base station and TDD DDRs with a TDD DDR Hub scaled up in size to support multiple base station sectors according to another preferred embodiment of the present invention.

As shown in FIG. 7, the DDR Hub 706 can be extended to multi-sector support through a simple replication of the single-sector DDR Hub 310 in FIG. 4. In FIG. 7, each sector is treated as a separate grouping of remote units with their associated base station sector. In all cases, there is a 1:1 connection from the DDR Hub 506 to the DDRs 704 over either separate fibers or separate wavelengths on a common fiber. The system may be either constructed from multiple copies of one sector DDR Hubs or be a single common, larger capacity DDR Hub. The latter may then share resources, such as the C&M element processor 316 for cost and space savings. In this case, all allocations of remote units 704 to base station sectors 702 are static. Alternatively, if used the TDD timing advance can be separately managed for each base station sector 702. For those sectors that do not use time advance it is preferred that all frame times are kept the same to prevent jamming at the remote end. The burst downlink and uplink burst lengths will need to be reduced in this case resulting in a lower net data rate.

Figure 8:
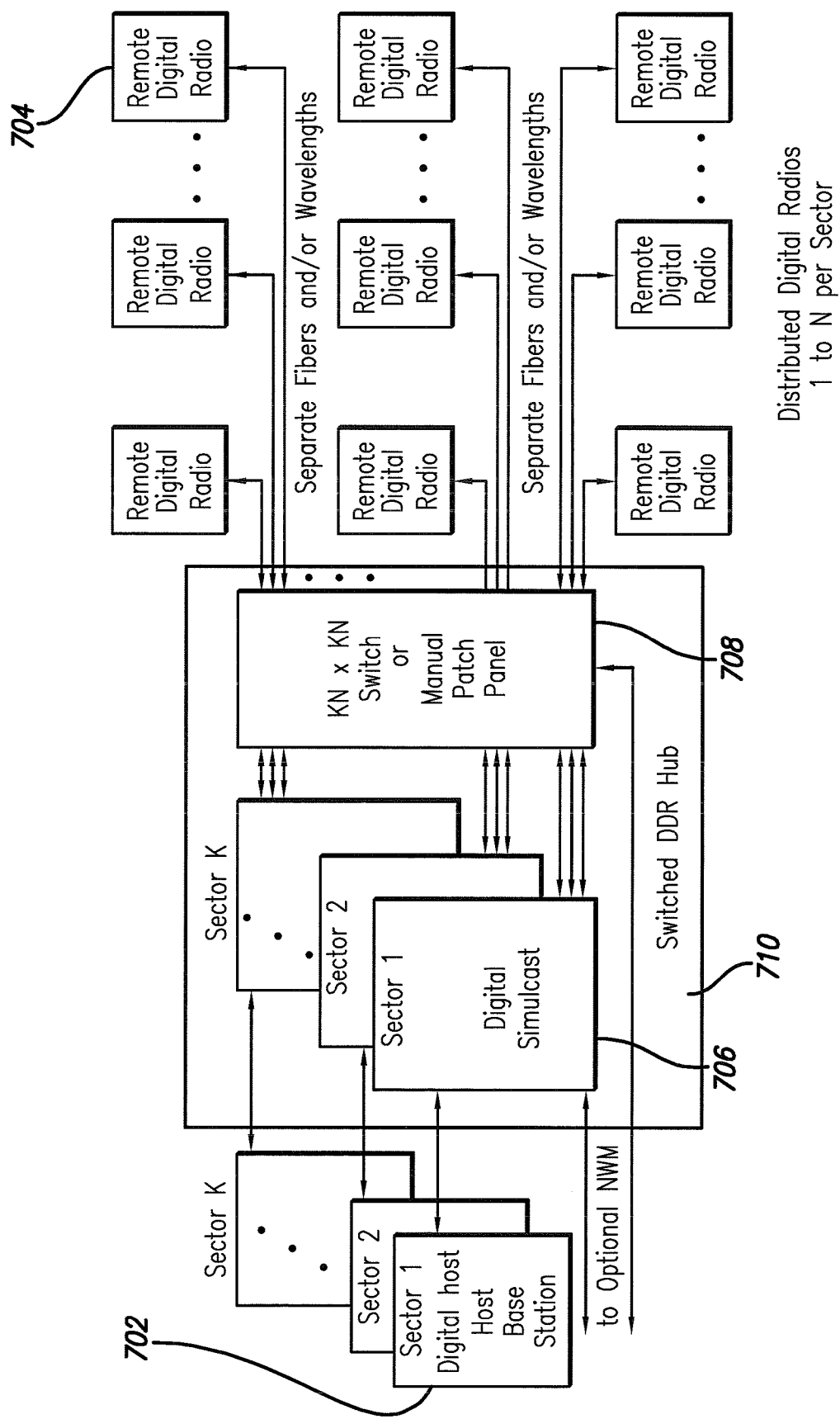
FIG. 8 is a block schematic drawing of a host TDD digital base station and Digital Distributed Radio with the addition of a digital switch to a multiple base station sector DDAS to provide capacity reallocation capability to the network.

FIG. 8 is a block schematic drawing of a host TDD digital base station 702 and remote DDR 704 with the addition of a switched DDR Hub 710 to a multiple base station sector DDAS to provide capacity reallocation capability to the network, according to another embodiment of the present invention.

FIG. 8 shows an expansion of the multi-sector DDR Hub 710 configuration from a static arrangement to a fully switch-capable arrangement. To utilize this switch capability, neither the DDRs 704 nor the DDR Hub 706 needs to change. The switch capability is an appliqué to the existing DDR hub configuration. By way of example, the switch capability can take two forms. The simplest embodiment is a manual patch panel 708 that allows the operator to reconfigure the connection between the DDRs 704 and the base station 702 as needed to fulfill capacity requirements. Any single DDR 704 can be connected to any base station sector 702 with the only constraint being the maximum simulcast per sector that is supported by the switched DDR Hub 710. This allows the operator to set up an initial capacity allocation on best a priori information and later still be able to redistribute capacity should any sector become overloaded.

Alternatively, the manual patch panel 708 can be replaced with a fully programmable electronic switch. The electronic switch embodiment eliminates the need for the operator to visit the DDR hub 706 to make capacity changes. Through IP connections, connectivity between the DDRs 704 and multiple base stations 702 can be changed remotely. The remote switching capability allows the operator to redistribute capacity in the following manner:

Manually reassign as needed to deal with long-term capacity changes.
    Timed reassignments based on historical capacity needs on a daily or hourly basis.
    Eventual automatic capacity-driven reassignments to allow the DDRs to adapt to capacity loads dynamically.

As will be appreciated by those skilled in the art, from the above disclosure the invention provides a number of features and advantages by incorporating simulcast techniques to digital distributed radio equipment that are supporting TDD airlinks. Specifically, in a preferred embodiment it is applied within the digital transport protocol between the base station and the remote radio electronics while resolving any ambiguities that can be generated by having a 1:N relationship between the donor base station interface and that of the remote digital radios. This invention also discloses a method to prevent the reduction in effective data rate due to fiber transport delays by manipulation of time delay management within both the DDAS Hub and the donor digital base station.

This invention present invention is distinguished from adding a simulcast DAS at the user side of the remote radio which defeats the benefit of allowing the digital radio to be placed directly within the coverage area. This invention also differs from demultiplexing multiple TDD airlinks from a composite digital interface and sending individual TDD airlinks to only one remote unit.

The foregoing description of preferred embodiments is presented for purposes of illustration and description. Furthermore, the description is not intended to limit the invention to the form disclosed herein. Accordingly, variants and modifications consistent with the following teachings, and skill and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. a digital distributed antenna system (DDAS), comprising: a base station providing transmit and receive time division duplexed (TDD) digital communication signals; a plurality of remote radio units, each radio unit having an associated programmable delay buffer; and a plurality of TDD fiber optic interface links coupled between the base station and the one or more remote radio units; wherein the base station provides a time advanced burst for downlink TDD communications with the one or more remote radio units to compensate for fiber transport delay and propagation delay, whereby said programmable delay buffers equalize time delay from said remote radio units to the base station; and wherein the time advanced burst provides a partial overlap at the base station of the downlink burst and the uplink burst from a remote user that has been repeated by the remote radio unit.

2. The DDAS system of claim 1, wherein the time advanced burst is transmitted by the remote radio after the remote radio has finished receiving the uplink burst of a previous burst from a remote user.

3. The DDAS system of claim 1, further comprising means for triggering the base station to provide said time advanced burst.

4. A digital distribution communication network, comprising:
  a base station providing a transmit and receive time division duplexed (TDD) digital communication signal;
  a plurality of TDD digital distributed radio (DDR) remotes coupled via separate TDD interface links to receive the TDD digital signal from the base station; and
  a TDD DDR hub configured to provide a 1:N downlink simulcast of the TDD digital communication signal, the TDD DDR hub coupled to the base station and each of the plurality of TDD DDR remotes, wherein the base station provides a time advanced burst for downlink TDD communication with the plurality of DDR remotes to compensate for fiber transport delay and propagation delay of the longest delay of the N remotes in the uplink TDD communication, whereby the DDR hub incorporates a programmable delay buffer to reflect the common delay value for the digital multiplexed signals from all of the DDR remote units.

5. The digital distribution communication network of claim 4, wherein the TDD hub comprises:
  a multiplexer coupled to the TDD base station;
  a plurality of fiber optic digital interface links coupled to a plurality of multiplexers and to each of the corresponding plurality of DDR remotes; and
  a user plane processor for implementing summation and splitting operations, and
  providing a programmable time delay for providing a common propagation delay value to the TDD communication signals to and from the plurality of TDD DDR remotes.

6. The digital distribution communication network of claim 4, further comprising:
  a Control and Management (C&M) processor for processing the C&M data plane from both the base station and the plurality of TDD DDR remotes and managing the simulcast distribution of the data plane to the plurality of DDR remotes.

7. The digital distribution communication network of claim 4, wherein the TDD DDR hub manages a remote digital interface delay to align a plurality of remote digital multiplexed TDD communication signals from the plurality of TDD DDR remotes.

8. The digital distribution communication network of claim 4, wherein each of the plurality of TDD DDR remotes comprise a programmable delay for equalizing all of the plurality of DDR propagation times to the TDD DDR Hub.

9. The digital distribution communication network of claim 4, wherein the TDD communication signal is a Common Public Radio Interface (CPRI) or Open Base Station Architecture Initiative (OBSAI) signal.

10. The digital distribution communication network of claim 4, wherein the time advanced burst provides a partial overlap of a base station downlink burst and a TDD DDR remote unit receipt of an uplink burst from a remote user.

11. The digital distribution communication network of claim 4, wherein the time advanced burst is transmitted by the remote after the TDD DDR remote has finished receiving the uplink burst of a previous burst from a remote user.

12. a method for providing a time division duplexed (TDD) digital communication signal between a digital base station and a plurality of remote digital distributed radios (DDRs), the method comprising: providing and receiving a multiplexed TDD communication signal at a digital base station via a digital distributed interface unit; processing the digital multiplexed TDD communication signal for controlled distribution of a 1:N simulcast distribution of the digital multiplexed TDD communication signal to and from a plurality of remote DDRs via separate TDD interface links; and providing a time advanced burst for downlink TDD communications with the plurality of remote radio units to compensate for fiber transport delay and propagation delay, wherein the digital distributed interface unit manages a remote digital interface delay to align a plurality of remote digital multiplexed TDD signals from the plurality of remote DDRs; and whereby the digital distributed interface unit co-operates with the plurality of DDR remote units to reflect the common delay value for the digital multiplexed signals from all remote DDR's.

13. The method of claim 12, wherein the time advanced burst provides a partial overlap of a base station downlink burst and the remote radio unit receipt of an uplink burst.

14. The method of claim 12, wherein the time advanced burst is transmitted by the remote DDR after the remote DDR has finished receiving the uplink burst of a previous burst from a remote user.

15. The method of claim 12, further comprising triggering the base station to provide said time advanced burst.

16. The method of claim 12, further comprising:
  processing a C&M data plane from both the digital base station and the plurality of remote DDRs; and
  managing the simulcast distribution of the data plane to the plurality of remote DDRs.

17. The method of claim 12, wherein each of the plurality of remote DDRs provides a programmable delay to equalize propagation time to the digital distributed interface unit.

18. The method of claim 12, wherein the multiplexed TDD signal is a Common Public Radio Interface (CPRI) or Open Base Station Architecture Initiative (OBSAI) signal.

19. The method of claim 12, wherein the plurality of remote DDRs provide airlink transmission to and from remote users.

20. The method of claim 12, wherein the digital distributed interface unit provides a programmable delay to equalize propagation time to the digital distributed interface unit from the plurality of DDR remote units.

* * * * *